United States Patent
Paz-Perez et al.

(10) Patent No.: US 11,875,527 B1
(45) Date of Patent: Jan. 16, 2024

(54) DESCRIPTOR GENERATION AND POINT CLOUD FUSION

(71) Applicant: Apple Inc., Cupertino, CA (US)

(72) Inventors: Lina M. Paz-Perez, San Jose, CA (US); Chavdar Papazov, Sunnyvale, CA (US); Vimal Thilak, Daly City, CA (US); Jai Prakash, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 17/224,192

(22) Filed: Apr. 7, 2021

Related U.S. Application Data

(60) Provisional application No. 63/008,929, filed on Apr. 13, 2020.

(51) Int. Cl.
| | |
|---|---|
| *G06T 7/73* | (2017.01) |
| *G06T 7/11* | (2017.01) |
| *G06T 7/64* | (2017.01) |
| *G06T 17/00* | (2006.01) |
| *G06F 18/25* | (2023.01) |

(52) U.S. Cl.
CPC .............. *G06T 7/73* (2017.01); *G06F 18/253* (2023.01); *G06T 7/11* (2017.01); *G06T 7/64* (2017.01); *G06T 17/00* (2013.01); *G06T 2207/20084* (2013.01); *G06T 2207/20132* (2013.01)

(58) Field of Classification Search
None
See application file for complete search history.

(56) References Cited

U.S. PATENT DOCUMENTS

| | | | |
|---|---|---|---|
| 9,159,166 B2 | 10/2015 | Finn et al. | |
| 9,701,015 B2 | 7/2017 | Buehler et al. | |
| 10,373,380 B2* | 8/2019 | Kutliroff | G06T 19/006 |
| 11,348,269 B1* | 5/2022 | Ebrahimi Afrouzi | G06T 7/344 |
| 11,430,206 B1* | 8/2022 | Papazov | G06T 7/11 |
| 11,562,560 B1* | 1/2023 | Ruepp | G06T 7/73 |
| 11,586,843 B1* | 2/2023 | Pertsel | G06F 18/214 |
| 11,589,183 B2* | 2/2023 | Tu | H04S 3/008 |
| 2020/0098141 A1* | 3/2020 | Mikkola | G06V 10/44 |
| 2020/0341466 A1* | 10/2020 | Pham | G06N 3/088 |
| 2022/0066456 A1* | 3/2022 | Ebrahimi Afrouzi | B25J 9/1697 |

FOREIGN PATENT DOCUMENTS

WO   WO 2015192117   12/2015

\* cited by examiner

*Primary Examiner* — Soo Shin
(74) *Attorney, Agent, or Firm* — Thompson Hine LLP

(57) ABSTRACT

Some implementations involve a process that identifies a subset of points in an image and creates descriptors for these points. The detection and descriptor process may use one or more neural networks. In some implementations, the process includes a neural network that uses one or more fixed (e.g., weight independent) neural network layers to perform certain functions that can be performed more accurately and/or efficiently than via non-fixed (e.g., weight-based) layers. In some implementations, for example, a neural network includes a layer that determines orientation formulaically within the neural network. Such orientations may be determined convolutionally (e.g., using sliding patches) but are not determined based on internal node weights within the layer that were determined during the training of the neural network.

18 Claims, 7 Drawing Sheets

DESCRIPTOR GENERATION AND POINT CLOUD FUSION

CROSS-REFERENCE TO RELATED APPLICATIONS

This application claims the benefit of U.S. Provisional Application Ser. No. 63/008,929 filed Apr. 13, 2020, which is incorporated herein in its entirety.

TECHNICAL FIELD

The present disclosure generally relates to systems, methods, and devices for creating and using representations of a physical environment using images and other sensor data.

BACKGROUND

Various techniques are used to create and use representations of physical environments. For example, pixels of images captured by cameras may be analyzed to identify elements within a physical environment depicted in the images. Convolutional neural networks, for example, may be used to identify features of images that are descriptive of content in the images. A convolutional neural network (CNN) is a neural network that has some type of specialization to detect and make sense of patterns in an image. A CNN may have convolutional layers that are configured to use filters to identify patterns, e.g., edges, corners, circles, squares, shapes, and combinations of such shapes that form eyes, hands, dogs, etc. The filters of a convolutional layer can be small matrices of specified size, e.g., 3 pixels×3 pixels. When a node associated with a filter of a convolutional layer receives input, the filter is applied for different blocks of pixels (e.g., each 3×3 block of pixels) from the input. The block-based analysis in which the filter is conceptually move or slide over different blocks of pixels is referred to as convolving. For each block of pixels, an output is determined based on the particular input block being assessed. The output may thus itself be an image or matrix of values corresponding to the pixels of the image and corresponding to how well each block around each such pixel matches a "pattern" that the filter is configured to identify. Filters may thus be used to assess which parts (e.g., blocks) of an image include particular features. Filters can be configured to be more complex or simple or combined with other filters to detect features of different types and complexities.

CNNs have been used to detect points and create descriptors for images. For example, CNNs have been used to select keypoints corresponding to corners, edges, and other features and to create descriptors for such points, for example, describing the locations and other attributes of such points. Existing detection and descriptor techniques may lack accuracy and efficiency. For example, existing techniques may attempt to learn (e.g., by adjusting node weights within the neural network) how to detect pixel orientations and curvature within an image. Such networks may be large and lack accuracy and efficiency.

Physical images and other sensor data are also used to create three dimensional (3D) models of physical environments. For example, 3D point clouds may be generated based on images of a physical environment. Existing techniques for creating, refining, and using such 3D models may not accurately and efficiently remove redundancy from multiple sources used to create such 3D models.

SUMMARY

Some implementations involve a process that identifies a subset of points in an image and creates descriptors for these points. The detection and descriptor process may use one or more neural networks. In some implementations, the process includes a neural network that uses one or more fixed (e.g., weight independent) neural network layers to perform certain functions that can be performed more accurately and/or efficiently than via non-fixed (e.g., weight-based) layers. In some implementations, for example, a neural network includes a layer that determines orientation formulaically within the neural network. Such orientations may be determined convolutionally (e.g., using sliding patches of pixel blocks) but not determined based on internal node weights within the layer that were determined during the training of the neural network. In this example, a neural network uses a precomputed-weight convolutional layer rather than learned-weight-based layer for orientation assessments. The orientations may then be used to determine the descriptors for the points. The points and associated descriptors identified by such techniques may be obtained efficiently and accurately. The points and associated descriptors may be used for various purposes, for example, to localize a 2D image by matching its keypoint descriptors with keypoint descriptors of a 3D model associated with a known location.

One implementation involves a computing device that executes instructions stored on a computer readable medium to perform a detection and descriptor method. The method obtains an image of a physical environment. For example, the method may obtain an image a current or prior physical environment captured by a camera on a mobile device. The method determines a subset of points of the image (e.g., selecting which points to use as keypoints) and orientations of the subset of points using a neural network of multiple layers. The layers may include a precomputed-weight layer configured to compute the orientations using image patches (e.g., convolutional/using sliding patches) independently of weights of the layers that were learned during training. One or more of the neural network's other layers may be convolutional layers that include learned weights and that are configured to identify corners and other features appropriate for use as keypoints. The orientation of each pixel may be computed by the precomputed-weight layer calculating a moment centroid, using gradients, or using a histogram of gradients.

After determining the subset of points and orientations, the method selects crops of the image for the subset of points based on the orientations and generates descriptors for the subset of points of the image based on the crops of the image. For example, the method may generate a normalized image crop for each of multiple identified keypoints and use that normalized image crop and/or additional information about each of the keypoints to generate a descriptors for each of the keypoints. The use of normalized image crops may facilitate better descriptors because such crops may provide more useful information about the keypoint in the environment. The selection of crops and/or the generation of the descriptors may involve additional processes and/or neural networks. In some implementations a single neural network is used to identify point, identify, orientations, and generate descriptors. In other implementations, separate neural networks are used for one or more of these functions.

In some implementations, a detection and descriptor process includes a neural network that includes a layer that determines curvature (e.g., to determine an estimate of cornerness) formulaically within the neural network. Such curvatures may be determined convolutionally (e.g., using sliding patches) but not determined based on internal node weights within the layer that were determined during the training of the neural network. In this example, a neural network uses a precomputed-weight convolutional layer rather than learned-weight-based layer for curvature assessments. The subset of points identified by the detection and descriptor process may be based on the curvature assessments. For example, the process may select keypoints based on points that are most likely to correspond to corners and other distinctive features. The keypoints and their descriptors that are identified by such a technique may be obtained efficiently and accurately and can be used for various purposes, for example, to localize a 2D image by matching its keypoint descriptors with keypoint descriptors of a 3D model associated with a known location.

One implementation involves a computing device that executes instructions stored on a computer readable medium to perform a detection and descriptor method. The method obtains an image of a physical environment and determines a subset of points of the image (e.g., selecting which points to use as keypoints) using a neural network having multiple layers. The layers may include a precomputed-weight layer (e.g., a fixed layer) configured to compute curvature using image patches (e.g., convolutional/using sliding windows) independently of weights of the layers that were learned during training. The subset of points may be determined based on the curvature, e.g., keypoints corresponding to corners and other significant features may be selected. In some implementations, curvature is computed for each pixel using its surrounding patch and used to estimate "cornerness" and provide a cornerness map that is used to select keypoints. After determining the subset of points, the method generates descriptors for the subset of points using the same or a different neural network or other appropriate feature generation technique, e.g., based on a crop associated with each point or otherwise.

In some implementations, points and descriptors from multiple sources, e.g., multiple images are combined into a single representation of a physical environment. For example, 3D point clouds of keypoints and associated descriptors of a physical environment may be combined. Some implementations provide a fusing process for fusing keypoints from multiple sources that are expected to correspond to the same features. For example, some keypoint data from multiple images may be redundant and thus fused, e.g., the same corner represented in keypoints identified from multiple images may be fused to be represented by a single keypoint. Some implementations identify redundancy amongst keypoints based on distances between keypoints providing significant advantages over prior systems that may have attempted to remove redundancy based on voxel position.

One implementation involves a computing device that executes instructions stored on a computer readable medium to perform a fusing method. The method obtains sets of points associated with a plurality of image sources. The points of the sets of points are associated with 3D locations and descriptors generated based on image characteristics from the plurality of image sources. For example, the sets of points may be point clouds associated with each of multiple images of the same physical environment. In some implementations, the location may be determined based on data from a depth sensor and device location. The method determines pairs of nearest neighbor points associated with different image sources of the plurality of image sources. For example, the method may identify that point A1 of point cloud A is nearest to point B1 of point cloud B. In some implementations, a nearest neighbor map is generated. The method generates fusion points representing the pairs of nearest neighbor points based on determining that locations of the nearest neighbor points of the pairs are within a threshold distance of one another. For example, the may involve only fusing mutual nearest neighbors, i.e., where A1 is the closest point of point cloud A to B1 and B1 is the closest point of point cloud B to A1.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
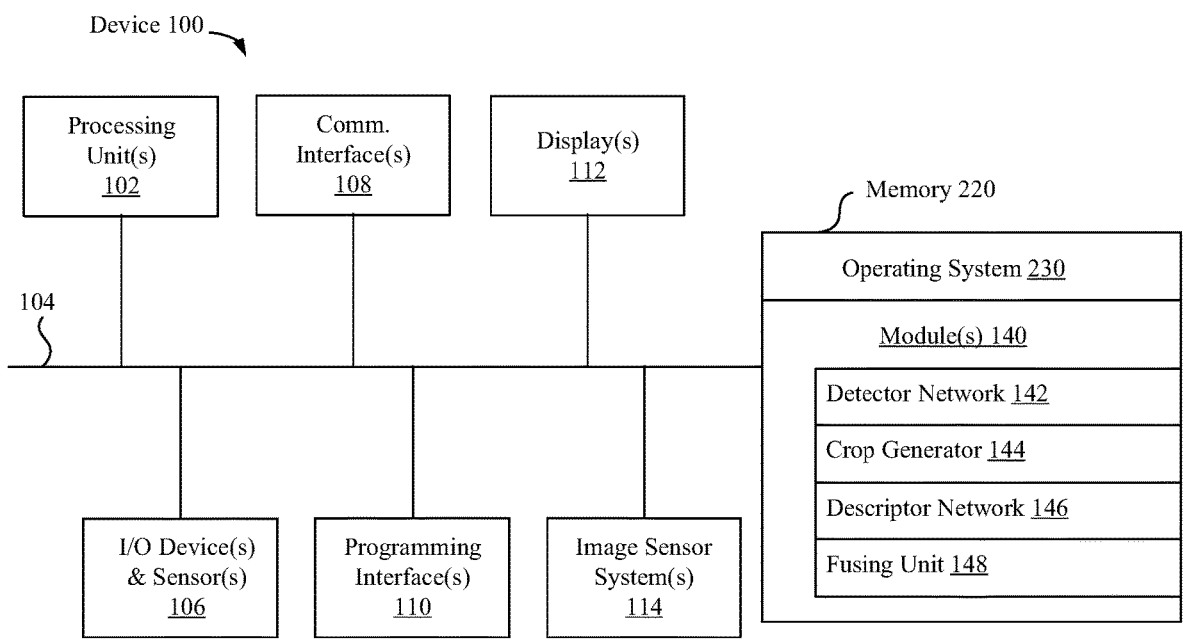
FIG. 1 is a block diagram of an example system architecture of an exemplary device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example system architecture of an exemplary device configured to perform detecting and descriptor processes and fusing processes in accordance with one or more implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 100 includes one or more processing units 102 (e.g., microprocessors, ASICs, FPGAs, GPUs, CPUs, processing cores, or the like), one or more input/output (I/O) devices 106, one or more communication interfaces 108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 110, a memory 120, and one or more communication buses 104 for interconnecting these and various other components.

In some implementations, the one or more communication buses 104 include circuitry that interconnects and controls communications between system components. In some implementations, the one or more I/O devices 106 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more image sensors, one or more microphones, one or more speakers, a haptics engine, one or more depth sensors (e.g., a structured light, a time-of-flight, or the like), one or more displays, or the like.

In some implementations, the one or more displays 112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays correspond to diffractive, reflective, polarized, holographic, etc., waveguide displays. In one example, the device 100 includes a single display or no display.

The memory 120 includes high-speed random-access memory, such as DRAM, SRAM, DDR RAM, or other random-access solid-state memory devices. In some implementations, the memory 120 includes non-volatile memory, such as one or more magnetic disk storage devices, optical disk storage devices, flash memory devices, or other non-volatile solid-state storage devices. The memory 120 optionally includes one or more storage devices remotely located from the one or more processing units 102. The memory 120 comprises a non-transitory computer readable storage medium. In some implementations, the memory 120 or the non-transitory computer readable storage medium of the memory 120 stores the following programs, modules and data structures, or a subset thereof including an optional operating system 130 and one or more modules 140. The operating system 130 includes procedures for handling various basic system services and for performing hardware dependent tasks.

The detector network 142 comprises a neural network configured to select points (e.g., keypoints) from images and other sensor data corresponding to a physical environment. The detector network 142 may identify orientations associated with the points selected. The detector network 142 may determine and/or use curvature or cornerness assessments to select points. The crop generator 144 comprises a module (e.g., an algorithm or machine learning process) configured to identify a crop from image data, e.g., a crop determined based on an orientation associated with a pixel that corresponds to a normalized portion of the environment around the pixel. The descriptor network 146 comprises a neural network configured to generate descriptors for points such as keypoints selected by the detector network 142. The descriptor network 146 may use crops of an image provided by crop generator 144. The fusing unit 148 is configured to obtain points from multiple sources and fuse points corresponding to redundant data items. The modules 140 may be used to perform one or more of the processes and techniques described throughout this description.

FIG. 1 is intended more as a functional description of the various features which are present in a particular implementation as opposed to a structural schematic of the implementations described herein. As recognized by those of ordinary skill in the art, items shown separately could be combined and some items could be separated. The actual number of units and the division of particular functions and how features are allocated among them will vary from one implementation to another and, in some implementations, depends in part on the particular combination of hardware, software, or firmware chosen for a particular implementation.

Figure 2:
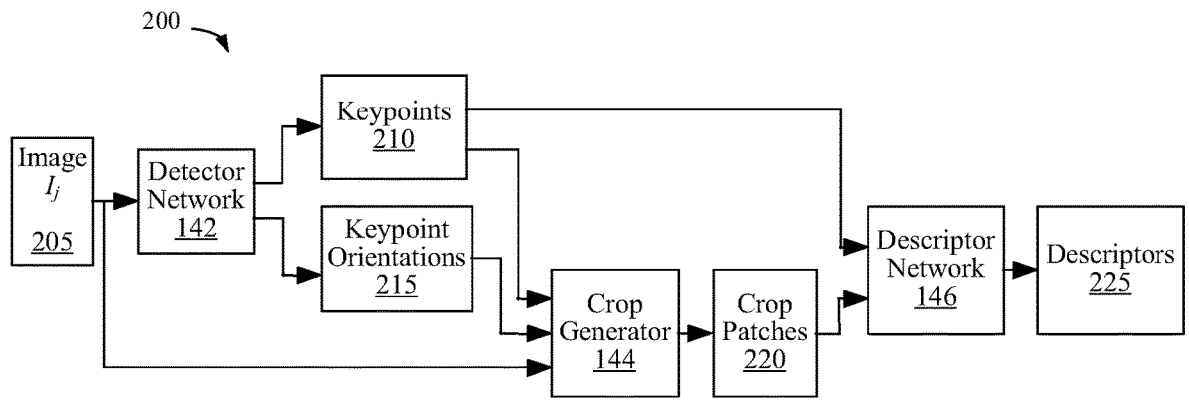
FIG. 2 is a block diagram illustrating an exemplary detection and descriptor process in accordance with some implementations.

FIG. 2 is a block diagram illustrating an exemplary detection and descriptor process 200 in accordance with some implementations. In some implementations the process 200 identifies a subset of points (e.g., keypoints 210) in an image (e.g., image $I_j$ 205) and creates descriptors (e.g., descriptors 225) for these points. In this example, input image $I_j$ 205 is input to detector network 142. Detector network 142 outputs keypoints 210 and keypoint orientations 215. The keypoints 210, keypoint orientations 215, and image $I_j$ 205 are input to crop generator 144 which outputs crop patches 220. Crop patches 220 may be normalized patches around each of the keypoints 210. The crop patches 220 and the keypoints 210 are input to the descriptor network 146 which generates descriptors 225 for the image $I_j$ 205. The descriptors 225 may identify the keypoints 210 and include additional attributes for the keypoints 210, e.g., location, greyscale values, color values, orientation, patch information, semantics, feature type, etc.

In some implementations, the process 200 includes a neural network (e.g., detector network 142) that uses one or more fixed (e.g., weight independent) neural network layers to perform certain functions that can be performed more accurately and/or efficiently than via non-fixed (e.g., weight-based) layers. In some implementations, for example, the detector network 142 includes a layer that determines orientation formulaically within the neural network. Such orientations may be determined convolutionally (e.g., using sliding patches) but are not determined based on internal node weights within the layer that were determined during the training of the neural network. In this example, the detector network 142 uses a precomputed-weight convolutional layer rather than learned-weight-based layer for orientation assessments.

Figure 3:
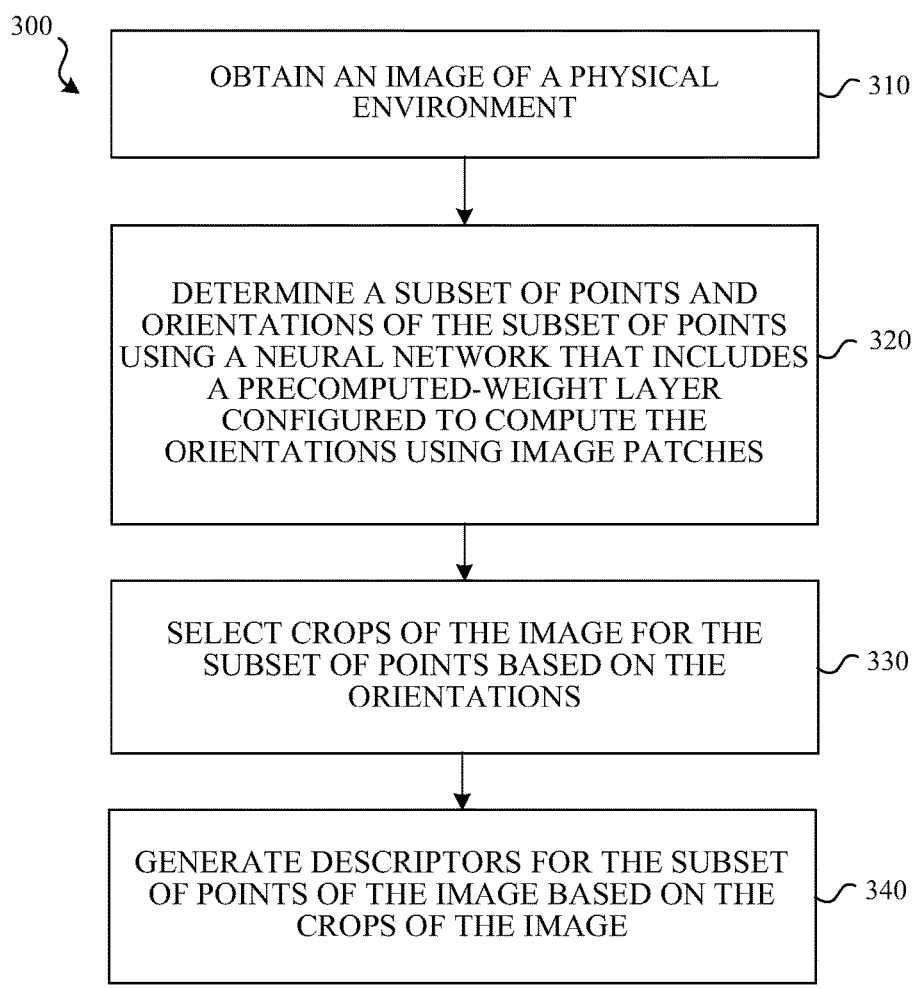
FIG. 3 is a flowchart representation of a detection and descriptor process in accordance with some implementations.

FIG. 3 is a flowchart representation of a detection and descriptor method 300. In some implementations, the method 300 is performed by a device (e.g., device 100 of FIG. 1). The method 300 can be performed at a mobile device, head mounted device (HMD), desktop, laptop, or server device. In some implementations, the method 300 is performed by processing logic, including hardware, firmware, software, or a combination thereof. In some implementations, the method 300 is performed by a processor executing code stored in a non-transitory computer-readable medium (e.g., a memory).

At block 310, the method 300 obtains an image of a physical environment. For example, the method may obtain an image a current or prior physical environment captured by a camera on a mobile device.

At block 320, the method 300 determines a subset of points of the image (e.g., selecting which points to use as keypoints) and orientations of the subset of points using a neural network of multiple layers. The layers include a precomputed-weight layer configured to compute the orientations using image patches independently of weights of the layers that were learned during training. The precomputed-weight layer may be a convolutional layer that uses a sliding window to identify a patch of multiple nearby points to associate with each point of the image.

Figure 4:
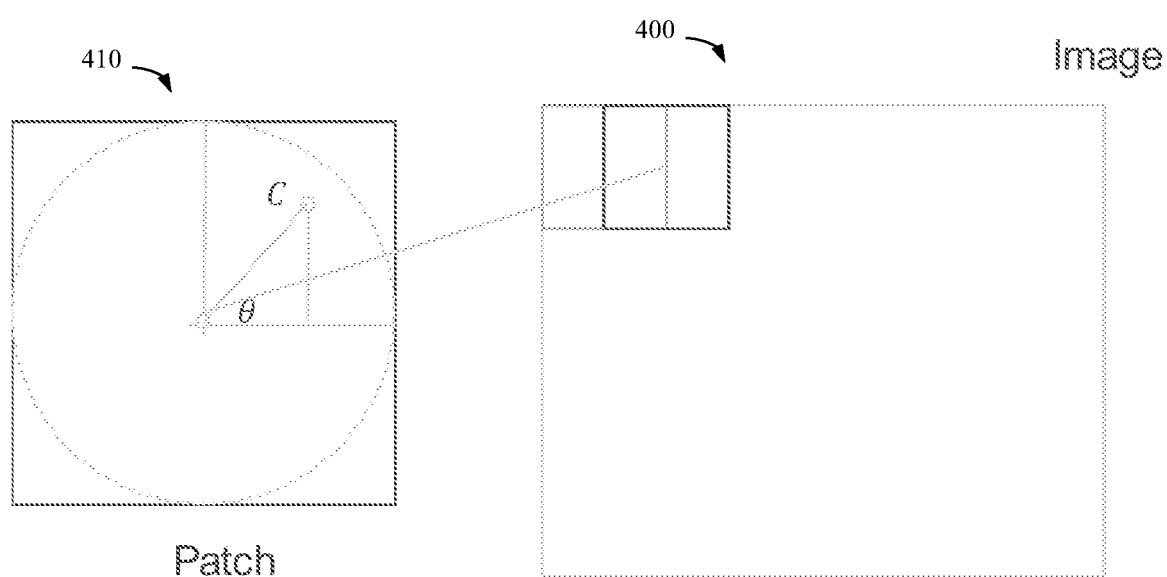
FIG. 4 is block diagram illustrating an exemplary determination of orientation using moments centroid in accordance with some implementations.

The precomputed-weight layer may be configured to compute an orientation of each pixel of the image by determining a moment centroid, gradients, or a gradient histogram. FIG. 4 is block diagram illustrating an exemplary determination of orientation using moments centroid. In this example, a patch 410 of an image 400 is identified and a moment centroid C is determined for the patch 410. The moment centroid C depends on two moments and provides an approximation of the gradients. This may involve summing up the intensity values in each of two directions and computing moments:

$$m_{pq} = \sum_{x,y} x^p y^p I(x, y)$$

Moments may be implemented as a dense map using 2D convolutions. The moment centroid may be determined:

$$C = \left(\frac{m_{10}}{m_{00}}, \frac{m_{01}}{m_{00}}\right)$$

The orientation may be determined as an angle.

$$\theta = \text{atan } 2(m_{01}, m_{10})$$

This orientation operation may be performed at a layer of a neural network. The operation may be performed on a patch using a set operation that acts on the patch and then the operation may be moved (e.g., pixel-by-pixel) in a convolutional way. Accordingly, it may be referred to as convolutional. While the determination is implemented as a functional operation, it is differentiable because it can be implemented as a convolution, which means it can be inserted and used as part of a deep learning network without interfering with training, e.g., without interfering with gradient flow back.

Returning to FIG. 3, one or more of the neural network's other layers may be convolutional layers configured to identify corners and other features appropriate for use as keypoints. The neural network accordingly may include layers that are trained to detect the salient points in an image based on what it has learned from data. The network may be trained to select points corresponding to corners or other shapes or otherwise to select points to use as keypoints that are appropriate for use as descriptor points for particular purposes, e.g., localization, semantics, etc.

At block 330, the method 300 selects crops of the image for the subset of points based on the orientations. For example, the method may generate a normalized image crop for each of the identified keypoints.

At block 340, the method 300 generates descriptors for the subset of points of the image based on the crops of the image. The use of normalized image crops may facilitate better descriptors because such crops may provide more useful information about the keypoint in the environment for use in generating the descriptors. Moreover, the descriptors that are generate may be invariant to the direction of the device when the image is captured since the orientations that are determined do not depend upon the capture device's position or direction.

The descriptors generated by method 300 may be used for numerous purposes. In one implementation, for example, a location of the image is determined based on matching the descriptors of the subset of points of the image with descriptors of points of a three-dimensional (3D) model associated with an identified location. For example, a device may capture an image of a physical environment and a descriptor matching process may determine the location of the image. In some implementations, a 3D map (e.g., a point cloud) includes descriptors of many physical environments including descriptors of 3D points within those environments. Descriptors from a given image may be compared with the descriptors of the 3D map to determine to which of the many environments represented in the 3D map the image corresponds. Efficient and accurate detection and descriptor processes may facilitate accurate localizations including 2D image to 3D map-based localizations.

Figure 5:
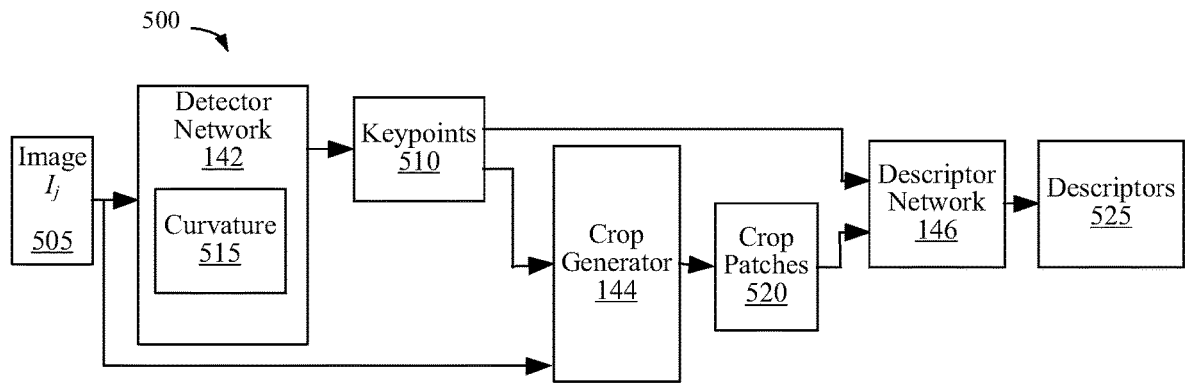
FIG. 5 is a block diagram illustrating an exemplary detection and descriptor process in accordance with some implementations.

FIG. 5 is a block diagram illustrating an exemplary detection and descriptor process 500. In some implementations the process 500 identifies a subset of points (e.g., keypoints 510) in an image (e.g., image $I_j$ 505) and creates descriptors (e.g., descriptors 525) for these points. In this example, input image $I_j$ 505 is input to detector network 142. Detector network 142 determines curvature 515 and uses the curvature to select and output keypoints 510. The keypoints 510 and image $I_j$ 505 are input to crop generator 144 which outputs crop patches 520. Crop patches 520 may be normalized patches around each of the keypoints 510, for example, based on orientation (not shown) provided by the detector network 142. The crop patches 520 and the keypoints 510 are input to the descriptor network 146 which generates descriptors 525 for the image $I_j$ 505. The descriptors 525 may identify the keypoints 510 and include additional attributes for the keypoints 510, e.g., location, greyscale values, color values, orientation, patch information, semantics, feature type, etc.

In some implementations, the detector network 142 includes one or more layers that determines curvature (e.g., cornerness) formulaically within the detector network 142.

Such curvatures may be determined convolutionally (e.g., using sliding patches) but are not determined based on internal node weights within the layer that were determined during the training of the neural network. In this example, the detector network 142 uses a precomputed-weight convolutional layer rather than learned-weight-based layer for curvature assessments. The subset of points identified by the detection and descriptor process 500 may be based on the curvature assessments. For example, the process 500 may select keypoints based on points that are most likely to correspond to corners and other distinctive features.

Figure 6:
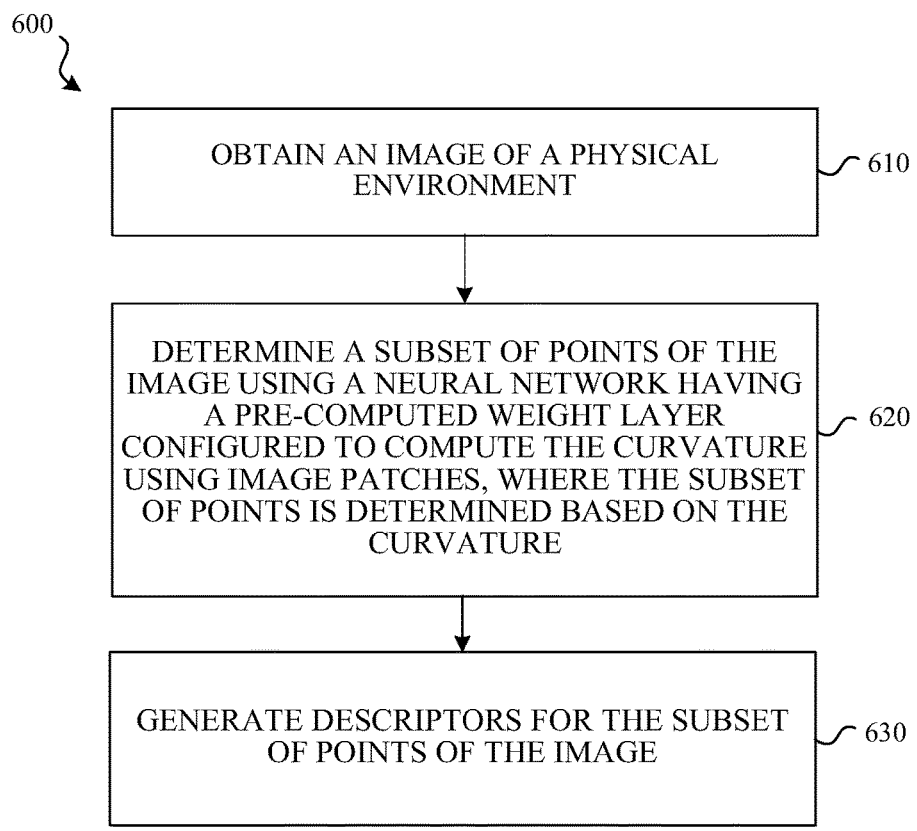
FIG. 6 is a flowchart representation of a detection and descriptor process in accordance with some implementations.

FIG. 6 is a flowchart representation of a detection and descriptor method 600 in accordance with some implementations. The method 600 can be performed at a mobile device, head mounted device (HMD), desktop, laptop, or server device. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 obtains an image of a physical environment. For example, the method 600 may obtain an image a current or prior physical environment captured by a camera on a mobile device.

At block 620, the method 600 determines a subset of points of the image (e.g., selecting which points to use as keypoints) using a neural network having multiple layers. The layers include a precomputed-weight layer configured to compute curvature using image patches independently of weights of the layers that were learned during training. The precomputed-weight layer may be a convolutional layer that uses a sliding window to identify a patch of multiple nearby points to associate with each point of the image. The subset of points may be determined based on the curvature, e.g., keypoints corresponding to corners and other significant features may be selected. In some implementations, curvature is computed for each pixel using its surrounding patch and used to estimate "cornerness" and provide a cornerness map that is used to select keypoints. The precomputed-weight layer may be configured to compute a cornerness map based on the curvature and the subset of points may be determined based on the cornerness map.

In some implementations, a Hessian M(x,y) is computed from a patch image using the first and second derivatives fx, fy and R is computed as a dense cornerness map that approximates the curve of the Hessian:

$$M(x, y) = \begin{bmatrix} f_x^2 & f_x f_y \\ f_x f_y & f_y^2 \end{bmatrix}.$$

The curvature of the Hessian depends on the eigenvalues but can be approximated with the trace and determinant of the matrix:

$$R = \text{Det}(M) - k Tr^2(M)$$

Where $\text{Det}(M) = \lambda_1 \cdot \lambda_2$ and $\text{Tr}(M) = \lambda_1 + \lambda_2$.

In some implementations, the corner measure and centroid moments are used to select keypoints.

At block 630, the method 600 generates descriptors for the subset of points of the image. This may involve using the same or a different neural network or other appropriate feature generation technique, e.g., based on a crop associated with each point or otherwise.

Figure 7:
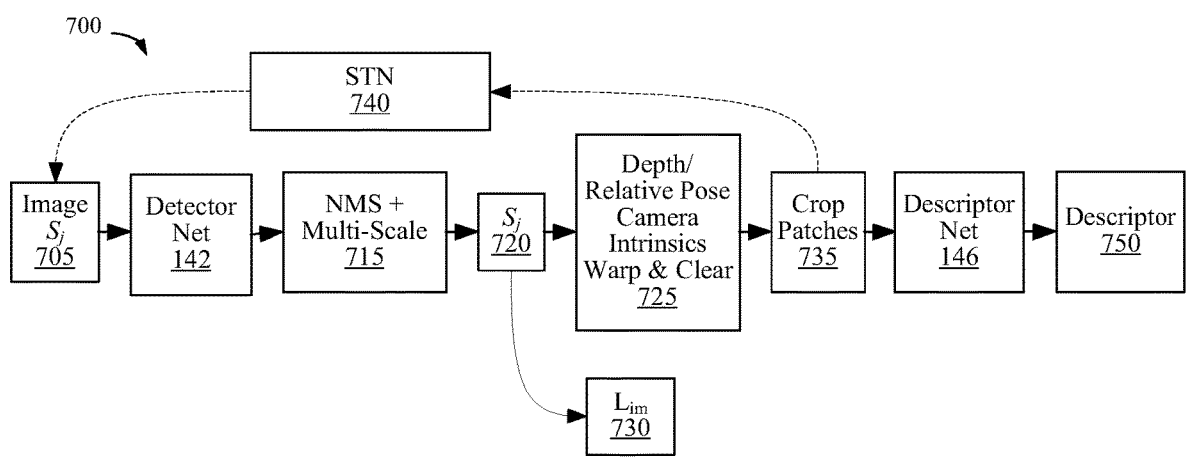
FIG. 7 is a block diagram illustrating a detection and descriptor process in accordance with some implementations.

FIG. 7 is a block diagram illustrating a detection and descriptor process. In this example, an image $S_j$ 705 is input to the detector network 142, which selects keypoints. The non-maxima suppression (NMS)+multi-scale block 715 determines the scale of the image $S_j$ 705. The depth/relative pose camera intrinsics warp and clear block 725 uses the scale information and image $S_j$ 705 to assess depth, pose, camera intrinsics, warp and clear and produces crop patches 735. The crop patches 735 are input to the descriptor network 146, which produces descriptors 750.

Exemplary Fusion Techniques

In some implementations, points and descriptors from multiple sources, e.g., multiple images are combined into a single representation of a physical environment. For example, 3D point clouds of keypoints and associated descriptors of a physical environment may be combined. Some implementations provide a fusing process for fusing keypoints from multiple sources that are expected to correspond to the same features. For example, some keypoint data from multiple images may be redundant and thus fused, e.g., the same corner represented in keypoints identified from multiple images may be fused to be represented by a single keypoint. Some implementations identify redundancy amongst keypoints based distances between keypoints.

Figure 8:
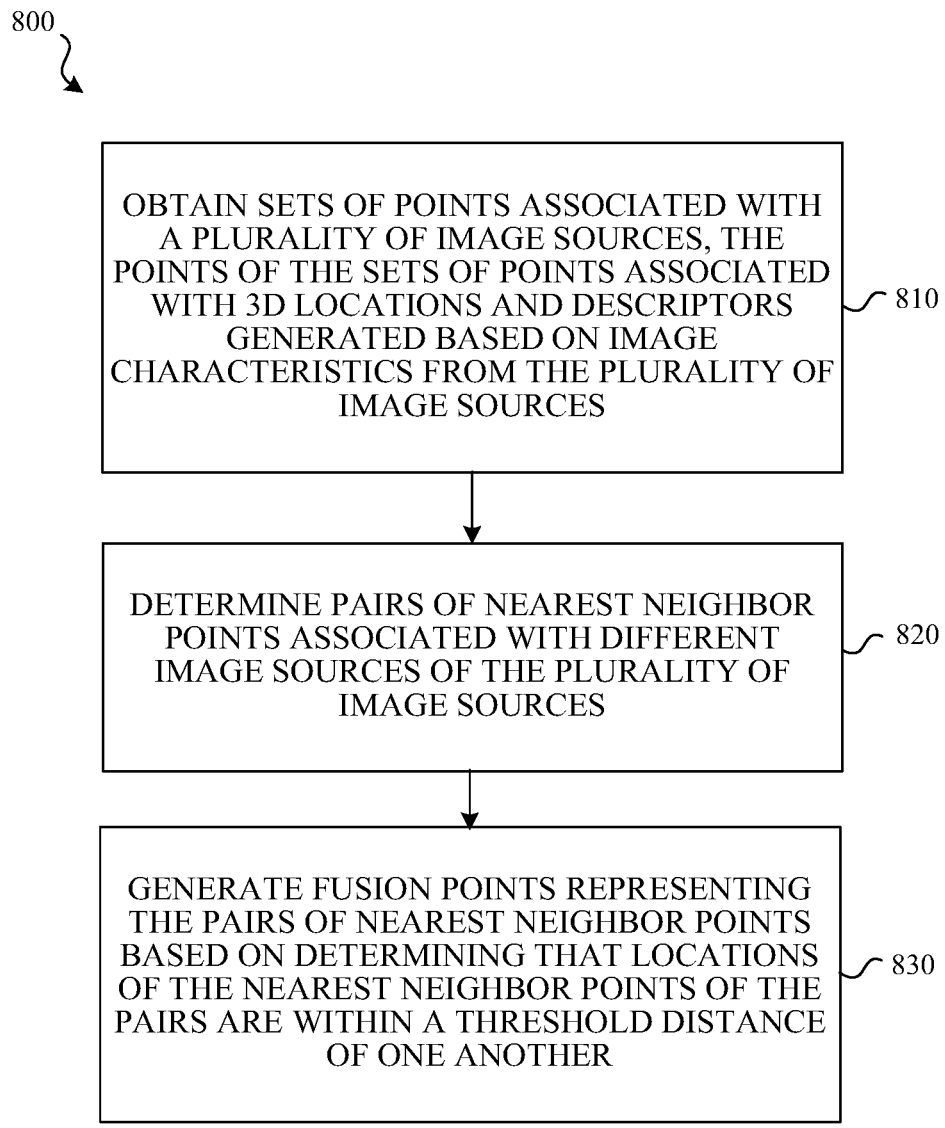
FIG. 8 is a flowchart representation of a fusing process in accordance with some implementations.

FIG. 8 is a flowchart representation of a fusing process 800. The method 800 can be performed at a mobile device, head mounted device (HMD), desktop, laptop, or server device. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 obtains sets of points associated with a plurality of image sources. The points of the sets of points are associated with 3D locations and descriptors generated based on image characteristics from the plurality of image sources. For example, the sets of points may be point clouds associated with each of multiple images. In some implementations, the location may be determined based on data from a depth sensor and device location. In some implementations, the sets of points are obtained from multiple images obtained from different locations as a device is moved around (e.g., on top of an automobile). In one example, a car is driven around and captures an image every few meters or every few seconds. In some implementations, devices are used to capture red-green-blue (RGB) images, event-camera based images, depth sensor images, and/or obtain additional information at discrete points. For example, an RGB image may be obtained at the same time as a depth camera image so that the two images may be correlated based on the known time correlation and spatial relationship between the two cameras. The location of the cameras and other sensors may be precisely known, for example, based on georeferencing techniques and sensor data. In some implementations, 3D point clouds are generated for each image and corresponding depth data using a back-projection technique.

At block 820, the method 800 determines pairs of nearest neighbor points associated with different image sources of the plurality of image sources. For example, the method may identify that point A1 of point cloud A is nearest to point B1 of point cloud B. In some implementations, a nearest neighbor map is generated.

At block 830, the method generates fusion points representing the pairs of nearest neighbor points based on determining that locations of the nearest neighbor points of the pairs are within a threshold distance of one another. For example, the may involve determining whether pairs of nearest neighbor points are mutual nearest neighbors and only fusing mutual nearest neighbors, i.e., where A1 is the closest point of point cloud A to B1 and B1 is the closest point of point cloud B to A1. The fusion points may be associated with information from one or more of the points that are fused. For example, the fusion points may be given an average location of the points of the source nearest neighbor points. In another example, the fusion points may be associated with all of the descriptors of the points of the source nearest neighbor points.

In some implementations, a fusion technique involves: (1) computing a nearest neighbor map that connects nearest neighbor points from different sources; (2) removing asymmetric connections (e.g., non-mutual connections); and (3) fusing points from two different sources based on their being mutual nearest neighbors and within a threshold distance of one another.

In some implementations, the fusing of points is based on determining a clique of three or more points based on a clique requirement and generating the fusion points involves generating a fusion point by fusing the three or more points of the clique. For example, such a technique may generate nodes in a graph that are connected to each other based on nearest neighbor determinations. The technique may select two points that are closest together spatially and proceed with adding additional points to the clique based on clique criteria. For example, a next nearest neighbor may be assessed for potential addition. A fusion point from such a fusion may be associated with an average location of the three or more points of the clique.

Figure 9:
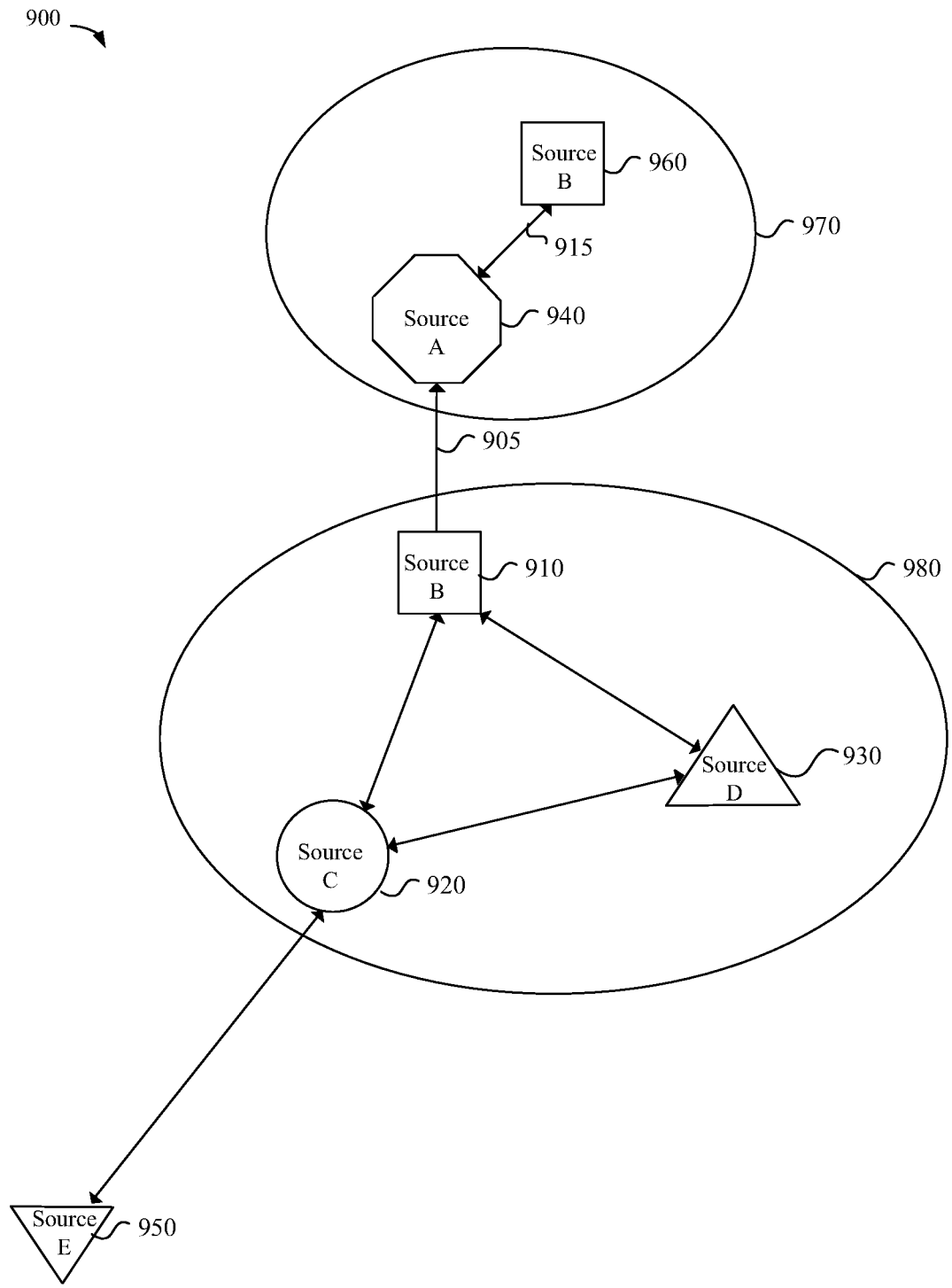
FIG. 9 is a block diagram illustrating points included in and excluded from a clique.

FIG. 9 is a block diagram illustrating points included in and excluded from a clique. In this example, a clique is established by evaluating nearest neighbor points. In this example, the technique first computes a nearest neighbor map 900 that connects nearest neighbor points 910, 920, 930, 940, 950 from different sources. In this example for the purposes of illustration each of the points 910, 920, 930, 940, 950 is from a different source. The technique removes the asymmetric connections (e.g., non-mutual connections) from the nearest neighbor map 900. Connection 905 is removed since it is not a mutual nearest neighbor connection. While point 940 is the nearest neighbor to point 910 from the source A, point 910 is not the nearest neighbor to point 940 from source B. The technique next builds a clique by adding points from different sources based on their being mutual nearest neighbors and within a threshold distance of one another. In this example, the technique first includes point 910 and and point 920 in the clique based on their being mutual nearest neighbors and within a threshold distance of one another. The technique then adds point 930 to the clique based on it being the mutual nearest neighbor to the points in the clique so far, e.g., to both point 910 from source B and point 920 from source C. The technique does not include points 940, 950, 960 since point 940 and point 960 are not mutual nearest neighbors with the clique's points and point 950 is not within the threshold distance of the clique. In some implementations, whether a point is within the threshold distance of a clique is based on a distance to a nearest point of the clique, a farthest point of the clique, every point in the clique, a percentage of points of the clique, or an average position or center of the clique. In this example, the points 910, 920, 930 of the clique 980 are fused to form a single point. A second clique 970 including points 940 and 960 is determined in a similar matter and the points 940 and 960 are fused to form another single point.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modifications may be implemented by those skilled in the art without departing from the scope and spirit of the invention.

What is claimed is:

1. A method comprising:
at an electronic device having a processor:
obtaining an image of a physical environment;
determining a subset of points of the image and orientations of the subset of points using a neural network comprising layers, the layers comprising a precomputed-weight layer configured to compute an orientation for each point of the subset of points based on:
identifying an image patch to associate with each point of the subset of points; and
using the image patch associated with each point of the subset of points to determine the orientation for each point of the subset of points, wherein the orientation of each point of the subset of points is determined formulaically via the precomputed-weight layer, wherein the orientation determined by the precomputed-weight layer is independent of weights of the layers that were learned during training;
selecting crops of the image for the subset of points based on the orientations; and
generating descriptors for the subset of points of the image based on the crops of the image.

2. The method of claim 1, wherein the precomputed-weight layer is a convolutional layer that uses a sliding window to identify a patch of multiple nearby points to associate with each point of the image.

3. The method of claim 1, wherein the precomputed-weight layer is configured to compute an orientation of each pixel of the image by determining a moment centroid, gradients, or a gradient histogram.

4. The method of claim 1, wherein the neural network comprises one or more convolutional layers trained to identify features depicted in the image, wherein the subset of points is determined based on the features.

5. The method of claim 1, wherein the neural network comprises a second precomputed-weight layer configured to estimate curvature, wherein the subset of points is determined based on the curvature.

6. The method of claim 1 further comprising determining a location of the image based on matching the descriptors of the subset of points of the image with descriptors of points of a three-dimensional (3D) model associated with an identified location.

7. The method of claim 1, wherein insertion of the precomputed-weight layer into the neural network enables a convolutional functional operation to determine orientations without interfering with training of the neural network.

8. The method of claim 1, wherein insertion of the precomputed-weight layer into the neural network provides a convolutional functional operation to determine orientations without interfering with gradient flow back during training of the neural network.

9. A method comprising:
at an electronic device having a processor:
obtaining an image of a physical environment;
determining a subset of points of the image using a neural network comprising layers, the layers comprising a precomputed-weight layer configured to compute curvature based on:
identifying image patches associated with the points of the image; and
using the image patches to determine the curvature formulaically via the precomputed-weight layer, wherein the curvature determined via the precomputed-weight layer is independent of weights of the layers that were learned during training, wherein the subset of points is determined based on the curvature; and
generating descriptors for the subset of points of the image.

10. The method of claim 9, wherein the precomputed-weight layer is a convolutional layer that uses a sliding window to identify a patch of multiple nearby points to associate with each point of the image.

11. The method of claim 9, wherein the precomputed-weight layer is configured to compute a cornerness map based on the curvature, wherein the subset of points is determined based on the cornerness map.

12. The method of claim 9, further comprising determining a location of the image based on matching the descriptors of the subset of points of the image with descriptors of points of a three-dimensional (3D) model associated with an identified location.

13. The method of claim 9, wherein insertion of the precomputed-weight layer into the neural network enables a convolutional functional operation to determine curvature without interfering with training of the neural network.

14. The method of claim 9, wherein insertion of the precomputed-weight layer into the neural network provides a convolutional functional operation to determine curvature without interfering with gradient flow back during training of the neural network.

15. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining an image of a physical environment;
determining a subset of points of the image and orientations of the subset of points using a neural network comprising layers, the layers comprising a precomputed-weight layer configured to compute an orientation for each point of the subset of points based on:
identifying an image patch to associate with each point of the subset of points; and
using the image patch associated with each point of the subset of points to determine the orientation for each point of the subset of points, wherein the orientation of each point of the subset of points is determined formulaically via the precomputed-weight layer, wherein the orientation determined by the precomputed-weight layer is independent of weights of the layers that were learned during training;
selecting crops of the image for the subset of points based on the orientations; and
generating descriptors for the subset of points of the image based on the crops of the image.

16. The system of claim 15, wherein the precomputed-weight layer is a convolutional layer that uses a sliding window to identify a patch of multiple nearby points to associate with each point of the image.

17. The system of claim 15, wherein the precomputed-weight layer is configured to compute an orientation of each pixel of the image by determining a moment centroid, gradients, or a gradient histogram.

18. The system of claim 15, wherein the neural network comprises one or more convolutional layers trained to identify features depicted in the image, wherein the subset of points is determined based on the features.

* * * * *